(12) United States Patent
Umetsu

(10) Patent No.: US 9,104,947 B2
(45) Date of Patent: Aug. 11, 2015

(54) IMAGE FORMING APPARATUS

(71) Applicants: KABUSHIKI KAISHA TOSHIBA, Tokyo (JP); TOSHIBA TEC KABUSHIKI KAISHA, Tokyo (JP)

(72) Inventor: Toshiyuki Umetsu, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/106,593

(22) Filed: Dec. 13, 2013

(65) Prior Publication Data
US 2014/0211225 A1    Jul. 31, 2014

(30) Foreign Application Priority Data
Jan. 30, 2013 (JP) .................................. 2013-15570

(51) Int. Cl.
G06K 15/02 (2006.01)
G06K 15/16 (2006.01)
B41J 2/32 (2006.01)

(52) U.S. Cl.
CPC ................. *G06K 15/028* (2013.01); *B41J 2/32* (2013.01); *B41J 2202/37* (2013.01)

(58) Field of Classification Search
USPC ......... 358/1.12, 1.9, 3.3, 1.14, 1.15; 399/193, 399/322
See application file for complete search history.

(56) References Cited

U.S. PATENT DOCUMENTS

| 4,941,017 | A | * | 7/1990 | Mishima et al. | ............... 399/193 |
| 5,918,087 | A | * | 6/1999 | Kimura et al. | .................. 399/69 |
| 6,859,631 | B2 | * | 2/2005 | Suzumi et al. | .................. 399/66 |
| 7,903,287 | B2 | * | 3/2011 | Itagaki et al. | .................. 358/1.9 |
| 8,478,151 | B2 |  | 7/2013 | Iguchi et al. | |
| 8,836,965 | B2 | * | 9/2014 | Yamada et al. | ............... 358/1.14 |
| 2010/0196063 | A1 | * | 8/2010 | Iguchi et al. | .................. 399/322 |
| 2011/0222937 | A1 |  | 9/2011 | Yahata et al. | |
| 2011/0262197 | A1 |  | 10/2011 | Imamiya et al. | |

FOREIGN PATENT DOCUMENTS

| JP | H06-99644 A | 4/1994 |
| JP | 07-049634 | 2/1995 |
| JP | 2001-154533 A | 6/2001 |
| JP | 2006-242983 A | 9/2006 |
| JP | 2010-181883 A | 8/2010 |

OTHER PUBLICATIONS

Japanese Office Action dated Sep. 18, 2014, for Application No. 2013-015570.
Office Action dated May 12, 2015, filed in Japanese Patent Application No. 2013-015570, and English translation.

* cited by examiner

*Primary Examiner* — Allen H Nguyen
(74) *Attorney, Agent, or Firm* — Patterson & Sheridan LLP

(57) ABSTRACT

According to the present invention, an image forming apparatus which performs a printing job and an erasing job is provided. Included is a control unit which, in a case of performing the other job after any one of the printing job and the erasing job, controls a transporting unit of the sheet so that the sheet for the other job is transported to a predetermined standby position from a sheet feeding unit while the one job is performed.

5 Claims, 8 Drawing Sheets

IMAGE FORMING APPARATUS

CROSS-REFERENCE TO RELATED APPLICATION

This application is based upon and claims the benefit of priority from the prior Japanese Patent Application No. 2013-15570, filed on Jan. 30, 2013, the entire contents of which are incorporated herein by reference.

FIELD

Embodiments described herein relate generally to an image forming apparatus which performs a printing job and an erasing job.

BACKGROUND

In recent years, due to the demand for saving resources, an image forming apparatus having an erasing function of erasing an image printed on a sheet has been developed. In a case of performing a printing job, the image forming apparatus prints the image on the sheet using erasable toner. The erasable toner is toner of which the color is erased at a predetermined erasing temperature. In a case of performing an erasing job, the image forming apparatus heats the image printed on the sheet using the erasable toner at the erasing temperature to erase the color of the erasable toner, thereby erasing the image.

The image forming apparatus includes a heating unit which heats the image on the sheet in order to perform the printing job and the erasing job. A heating temperature of the heating unit varies between the case of performing the printing job and the case of performing the erasing job. An operation mode of the image forming apparatus is temporarily a preparation mode in order to change the heating temperature during switching between the printing job and the erasing job. The operation mode of the image forming apparatus transitions to an operation mode for each job after the preparation mode. Therefore, in a case of performing the erasing job subsequent to the printing job, or in a case of performing the printing job subsequent to the erasing job, there is a problem in that the image forming apparatus takes time for making a switching between the operation modes.

DETAILED DESCRIPTION

According to an embodiment, there is provided an image forming apparatus which performs a printing job and an erasing job. The image forming apparatus includes a sheet feeding unit, a heating unit, a transporting unit, and a control unit. The sheet feeding unit accommodates sheets to be transported to the heating unit. The heating unit, in order to fix an image formed on a sheet to the sheet in a case of performing the printing job, heats the image at a fixing temperature, and, in order to erase the image formed on the sheet in a case of performing the erasing job, heats the image at an erasing temperature. The transporting unit transports the sheet from the sheet feeding unit to the heating unit via an image forming unit. In a case of performing the other job after any one of the printing job and the erasing job, the control unit controls the transporting unit so that the sheet for the other job is transported to a predetermined standby position from the sheet feeding unit during performing the one job.

Figure 1:
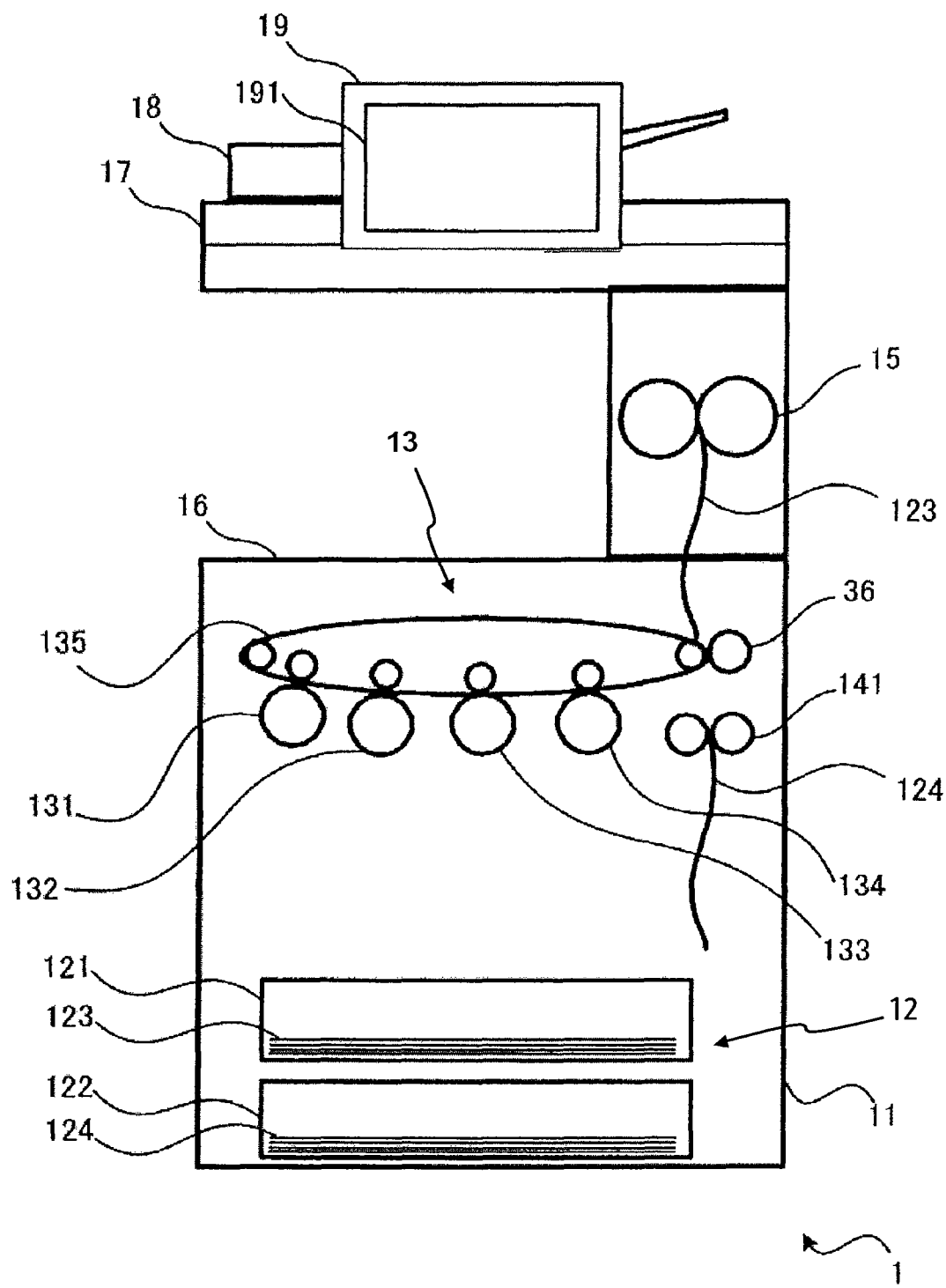
FIG. 1 is a cross-sectional view illustrating main parts of an image forming apparatus of an embodiment.
Figure 2:
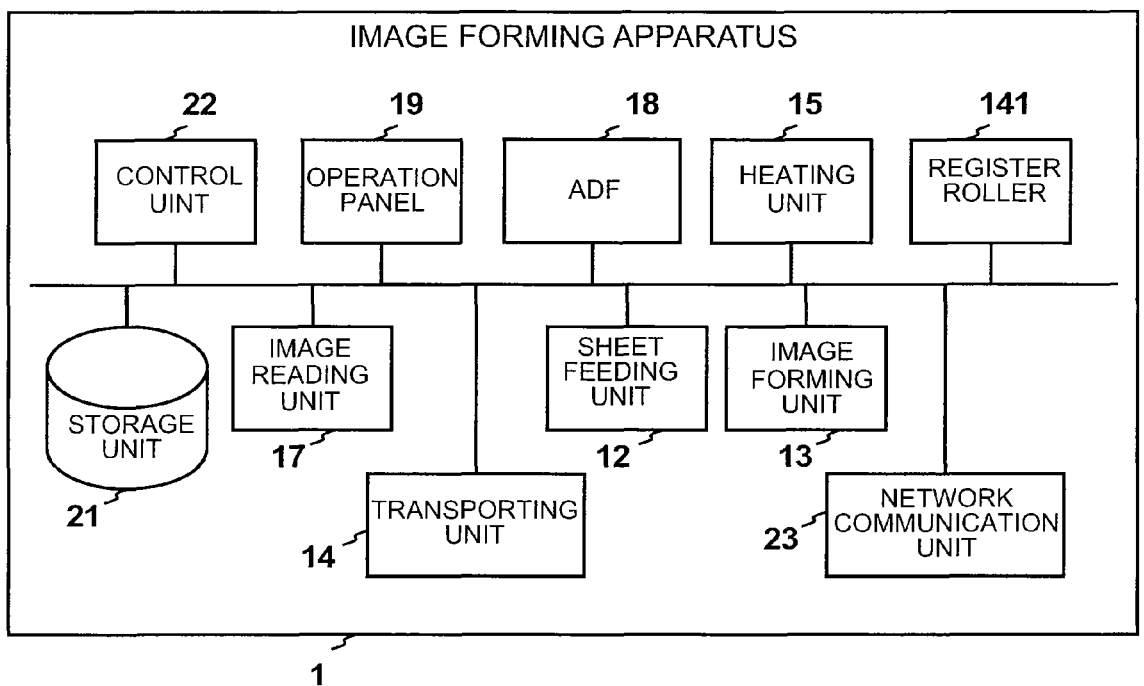
FIG. 2 is a block diagram illustrating a hardware configuration of the image forming apparatus of the embodiment.

Hereinafter, the embodiment will further be described with reference to the drawings. In the drawings, like reference numerals denote like or similar elements. The configuration of the embodiment will be described with reference to FIGS. 1 and 2. FIG. 1 is a cross-sectional view illustrating main parts of the image forming apparatus of the embodiment. FIG. 2 is a block diagram illustrating the hardware configuration of the image forming apparatus of the embodiment.

An image forming apparatus 1 is a multi function peripheral (MFP). The image forming apparatus 1 includes, in an apparatus main body 11, a sheet feeding unit 12, a color image forming unit 13, a register roller 141, a heating unit 15, a discharge unit 16, a transporting unit 14, an image reading unit 17 which reads an image printed on a document sheet, an automatic document feeding unit (ADF) 18, and an operation panel 19. The discharge unit 16 accommodates sheets discharged from the heating unit 15. The transporting unit 14 transports sheets in the sheet feeding unit 12 to the image forming unit 13 and the heating unit 15. The ADF 18 automatically transports sheets to the image reading unit 17.

The sheet feeding unit 12 includes, as illustrated in FIG. 1, a first accommodation unit 121 and a second accommodation unit 122. The first accommodation unit 121 accommodates a first sheet 123 which is not subjected to a printing process yet. The second accommodation unit 122 accommodates a second sheet 124 on which an image is printed using erasable toner. In other words, the first accommodation unit 121 accommodates the first sheet for a printing job. The second accommodation unit 122 accommodates the second sheet for an erasing job. The erasable toner is fixed onto a sheet while maintaining its colored state by being heated at a predetermined fixing temperature. In addition, the erasable toner is erased by being heated at an erasing temperature which is higher than the fixing temperature. The fixing temperature and the erasing temperature are determined in advance on the basis of characteristics of the toner.

The image forming unit 13 forms an image using a well-known electrophotographic method. The image forming unit 13 includes process units 131, 132, 133, and 134 which form toner images of a plurality of colors (yellow, cyan, magenta, and black) on photoconductors, which will be described below, and primarily transfer the toner images to an intermediate transfer belt 135 from the photoconductors. The process unit 131 primarily transfers a yellow toner image to the intermediate transfer belt 135. The process unit 132 primarily transfers a cyan toner image to the intermediate transfer belt 135. The process unit 133 primarily transfers a magenta toner image to the intermediate transfer belt 135. The process unit 134 primarily transfers a black toner image to the intermediate transfer belt 135. The process units 131 to 134 form a color toner image in which the toner images of the respective colors overlap, on the intermediate transfer belt 135 by primarily transferring the toner images of the respective colors. The image forming unit 13 further includes a secondary transfer roller 36. The secondary transfer roller 36 secondarily transfers the color toner image to the sheet at a secondary transfer position that comes into contact with the intermediate transfer belt 135. In other word, the image forming unit 13 forms the image on the sheet at an image formation position as the secondary transfer position.

Each of the process units 131 to 134 includes a photoconductor, a charging unit, an exposure unit, a developing unit, and a cleaning unit. The photoconductor has a photosensitive layer on a surface. The charging unit uniformly charges the surface of the photoconductor. The exposure unit exposes the photosensitive layer of the photoconductor charged by the charging unit to form an electrostatic latent image. The developing unit supplies toner to the photoconductor and develops the electrostatic latent image to cause an image to appear. On the photoconductor, a toner image is formed by the toner attached to the electrostatic latent image. The cleaning unit recovers the toner that remains on the photoconductor after the toner image is transferred to the intermediate transfer belt 135.

The heating unit 15 is provided at a position on a downstream side in relation to the image forming unit 13 in a sheet transport direction of the transporting unit 14. The heating unit 15 performs a heating process on the first sheet 123 and on the second sheet 124 respectively transported from the first accommodation unit 121 and the second accommodation unit 122 by the transporting unit 14. Specifically, in a case where the image forming apparatus 1 performs the printing job, the heating unit 15 is controlled by a control unit 22 to cause the heating temperature to be the fixing temperature. The heating unit 15 heats the image (the toner image) transferred by the secondary transfer roller 36 at the fixing temperature so as to be fixed to the first sheet 123. The image forming apparatus 1 completes the printing job by fixing the image to the sheet. After the heating and fixing, the first sheet 123 on which the image is printed is discharged to the discharge unit 16 by the transporting unit 14. In a case where the image forming apparatus 1 performs the erasing job, the heating unit 15 is controlled by the control unit 22 to cause the heating temperature to be the erasing temperature. The heating unit 15 heats the image printed on the second sheet 124 which is transported from the second accommodation unit 122 so as to be erased. The sheet after being subjected to heating and erasing is discharged to the discharge unit 16 by the transporting unit 14.

The register roller 141 is provided at a position on an upstream side in relation to the image forming unit 13 in the sheet transport direction of the transporting unit 14. In the case where the image forming apparatus 1 performs the printing job, the register roller 141 transports the first sheet 123 to the secondary transfer position at a timing at which the image forming apparatus forms the image on the sheet. In the case where the image forming apparatus 1 performs the erasing job, the register roller 141 transports the second sheet 124 to the heating unit 15.

The operation panel 19 includes a touch panel type display unit 191 and operation keys such as a numeric keypad, a stop key, and a start key. The operation panel 19 receives input information regarding the printing job and the erasing job from a user. In addition, the operation panel 19 displays an execution status of a process regarding the printing job and the erasing job, a status of each unit of the image forming apparatus 1, and the like for the user.

The image forming apparatus 1 includes, as illustrated in FIG. 2, a storage unit 21, the control unit 22, the operation panel 19, the image reading unit 17, the transporting unit 14, the ADF 18, the sheet feeding unit 12, the heating unit 15, the image forming unit 13, the register roller 141, and a network communication unit 23.

The storage unit 21 has, for example, a volatile or non-volatile memory. The storage unit 21 stores various types of information or programs used in the image forming apparatus 1. The storage unit 21 stores information or programs that need to be permanently stored in a non-volatile memory region. The storage unit 21 is configured by, for example, a random access memory (RAM), a read only memory (ROM), a dynamic random access memory (DRAM), a static random access memory (SRAM), a video RAM (VRAM), or a hard disk drive (HDD).

The storage unit 21 stores various types of information set in the operation panel 19, and the printing job and the erasing job received by the operation panel 19. The storage unit 21 further stores various types of information transmitted from an information terminal device (not illustrated), and the printing job and the erasing job received from the information terminal device.

The control unit 22 has a processor such as a central processing unit (CPU). The control unit 22 collectively controls the entire image forming apparatus 1. The control unit 22 has a role of performing various processes in the image forming apparatus 1, and executes programs regarding various functions stored in the storage unit 21. The control unit 22 performs control for the printing job and the erasing job in the order stored in the storage unit 21 according to the programs.

In the case where the image forming apparatus 1 performs the printing job stored in the storage unit 21, the control unit 22 controls the operation of the transporting unit 14 to transport the first sheet 123 to the image forming unit 13 from the first accommodation unit 121. The control unit 22 controls the operation of the image forming unit 13 to transfer the toner image (image) to the first sheet 123. Furthermore, the control unit 22 controls the operation of the heating unit 15 to cause the heating temperature of the heating unit 15 to be the fixing temperature. The heating unit 15 heats the toner image on the first sheet 123 at the fixing temperature to be fixed to the first sheet 123. In the case where the image forming apparatus 1 performs the erasing job stored in the storage unit 21, the control unit 22 controls the operation of the heating unit 15 to cause the heating temperature of the heating unit 15 to be the erasing temperature. The control unit 22 controls the operation of the transporting unit 14 to transport the second sheet 124 to the heating unit 15 from the second accommodation unit 122. The heating unit 15 heats the image (the toner image) printed on the second sheet 124 at the erasing temperature so as to be erased.

Functions realized using the storage unit 21 and the control unit 22 may be realized by mounting an application specific integrated circuit (ASIC).

The network communication unit 23 has a board that can communicate with a wired or wireless network. The network communication unit 23 controls data communication with one or more information terminal devices (for example, a personal computer) or a server.

Figure 3A:
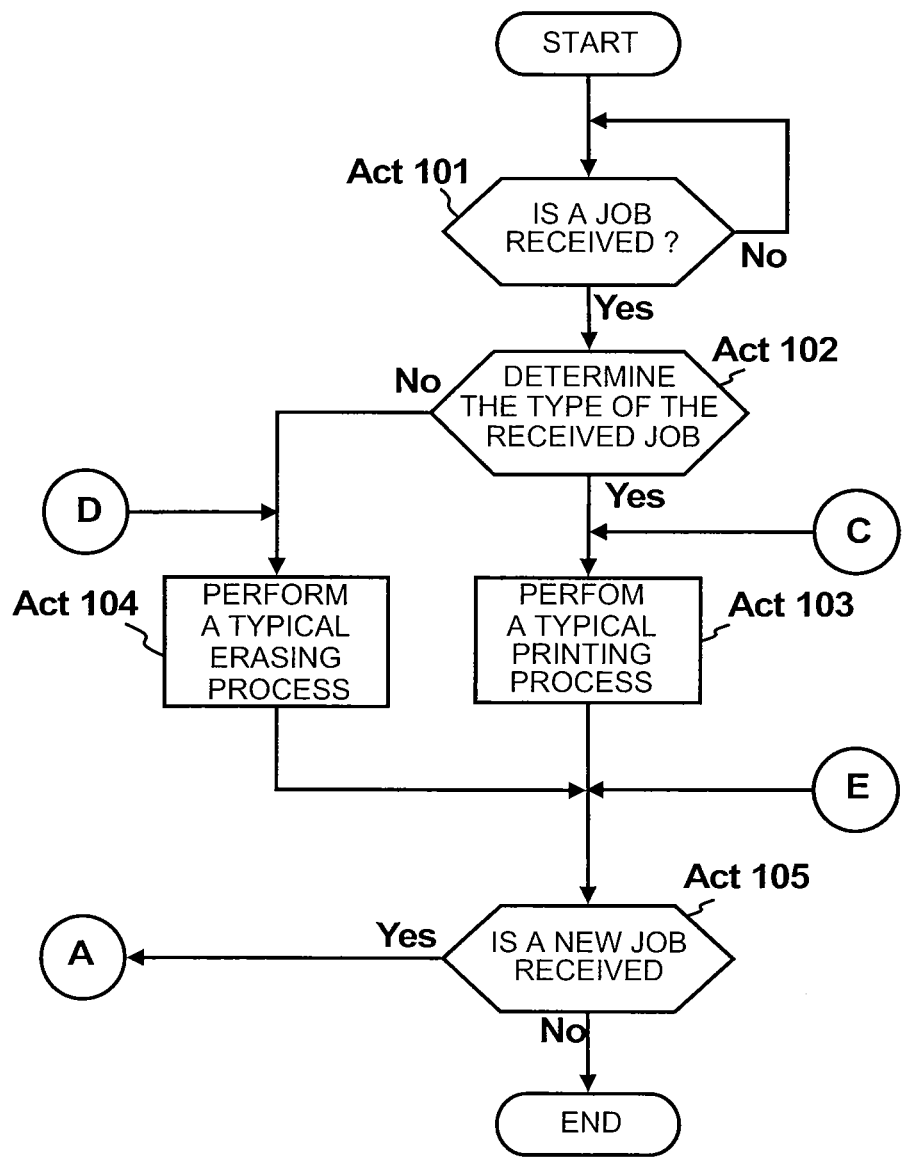
FIGS. 3A to 3C are control flowcharts illustrating operations when the image forming apparatus of the embodiment performs jobs.
Figure 3B:
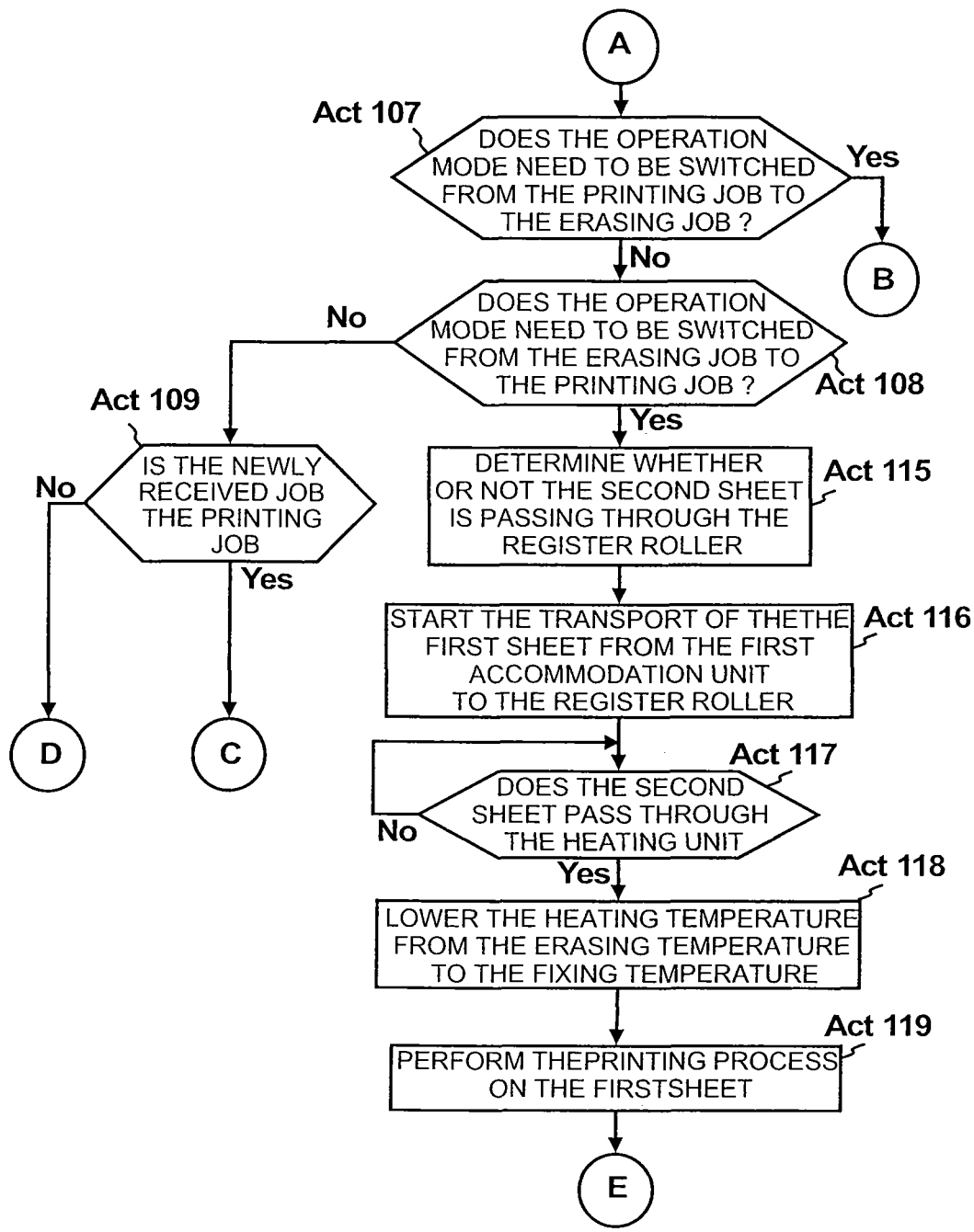
Figure 3C:
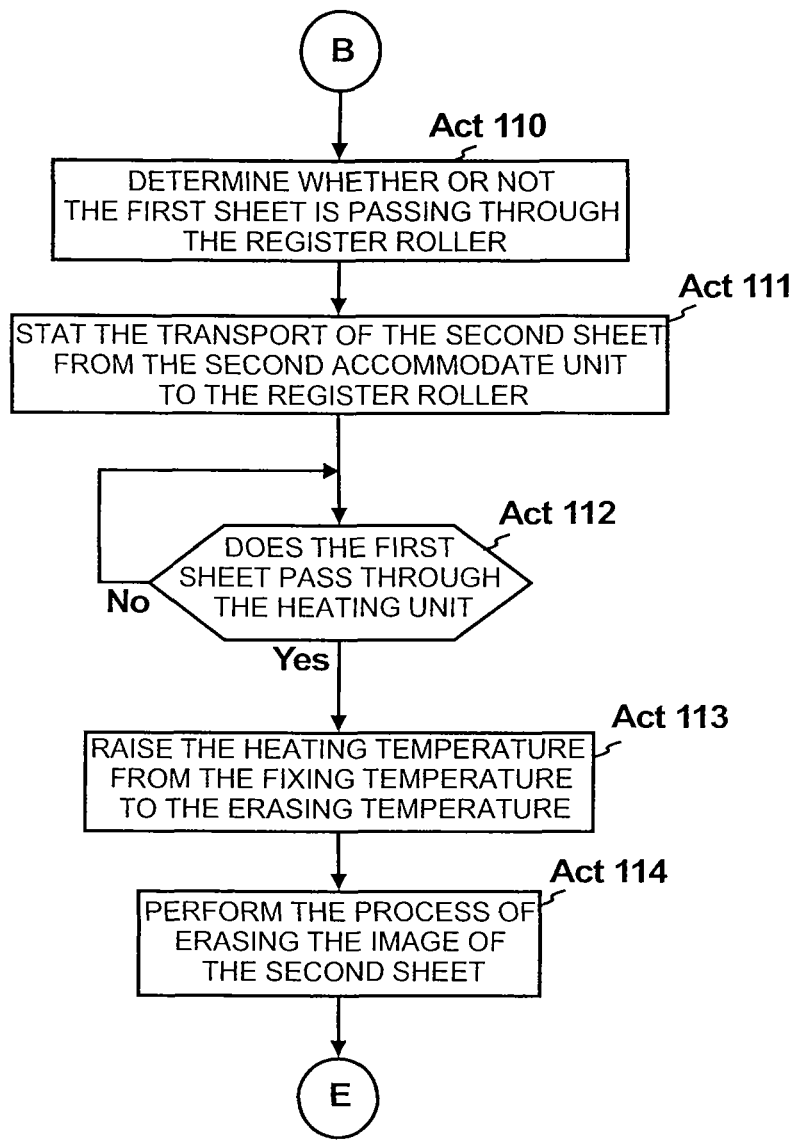

The operation of the image forming apparatus 1 will be described with reference to FIGS. 3A to 3C. FIGS. 3A to 3C are control flowcharts illustrating operations when the image forming apparatus 1 performs jobs. In an initial state, the image forming apparatus 1 accommodates a plurality of the first sheets 123 in the first accommodation unit 121 and accommodates a plurality of the second sheets 124 in the second accommodation unit 122.

Execution of a first job received by the image forming apparatus 1 from the operation panel 19 or the information terminal device will be described with reference to FIG. 3A.

As illustrated in FIG. 3A, in ACT 101, the control unit 22 determines whether or not a job (the printing job and/or the erasing job) is received from the operation panel 19 or the information terminal device. When the control unit 22 determines that the job is received (Yes in ACT 101), the operation of the image forming apparatus 1 proceeds to ACT 102. In ACT 102, the control unit 22 determines the type of the received job.

When the control unit 22 determines that the received job is the printing job (Yes in ACT 102), the operation of the image forming apparatus 1 proceeds to ACT 103. In ACT 103, in order to perform the printing job, the control unit 22 controls the operations of the transporting unit 14, the image forming unit 13, the heating unit 15, and the like. The image forming apparatus 1 performs a typical printing process, which will be described later. After ending the printing job, the operation of the image forming apparatus 1 proceeds to ACT 105.

In ACT 102 described above, when the control unit 22 determines that the received job is not the printing job, in other words, when the control unit 22 determines that the received job is the erasing job (No in ACT 102), the operation of the image forming apparatus 1 proceeds to ACT 104. In ACT 104, the control unit 22 controls the operations of the transporting unit 14, the heating unit 15, and the like. The image forming apparatus 1 performs a typical erasing process, which will be described later. After ending the erasing job, the operation of the image forming apparatus 1 proceeds to ACT 105.

The typical printing process will be described. In the typical printing process, the control unit 22 controls the operations of the transporting unit 14 and the register roller 141 to transport the first sheet 123 in the first accommodation unit 121 to the image forming unit 13. Furthermore, the control unit 22 controls the operation of the image forming unit 13 to transfer the image (the toner image) to the first sheet 123 from the intermediate transfer belt 135. Furthermore, the control unit 22 controls the operation of the transporting unit 14 to transport the first sheet 123 having the image transferred thereon to the heating unit 15. Furthermore, the control unit 22 controls the operation of the heating unit 15 to cause the heating temperature of the heating unit 15 to be the fixing temperature. The heating unit 15 heats the image of the first sheet 123 to be fixed to the first sheet 123. After the fixing, the first sheet 123 having the image printed thereon is discharged to the discharge unit 16.

When the image forming apparatus 1 continuously performs the typical printing process, for example, while the image forming unit 13 transfers the image to the preceding first sheet 123 (for example, the first one of the first sheets 123), the transporting unit 14 and the register roller 141 transport the next first sheet 123 (for example, the second one of the first sheets 123) toward the image forming unit 13 from the first accommodation unit 121.

When the preceding first sheet 123 (the first one of the first sheets 123) picked and transported by the register roller 141 passes through the register roller 141, subsequently, the next sheet (the second one of the first sheets 123) is picked by the register roller 141. The first sheet 123 picked by the register roller 141 temporarily waits until a timing at which an image can be formed on the next sheet and until a timing that the sheet transported first is not overlapped such that the timing to transport the sheets to the image forming unit 13 is adjusted. The image forming apparatus 1 continuously performs the printing process by adjusting the transport timing. The toner image of the next first sheet 123 on which the toner image is transferred by the image forming unit 13 is fixed by the heating unit 15, and the first sheet 123 is discharged to the discharge unit 16.

The typical erasing process will be described. In the typical erasing process, the control unit 22 controls the operation of the heating unit 15 to cause the heating temperature of the heating unit 15 to be the erasing temperature. The control unit 22 controls the operations of the transporting unit 14 and the register roller 141 to transport the second sheet 124 in the second accommodation unit 122 to the heating unit 15. The heating unit 15 heats the image printed on the second sheet 124 to be erased. The second sheet 124 from which the image is erased is discharged to the discharge unit 16.

When the image forming apparatus 1 continuously performs the typical erasing process, for example, while the heating unit 15 performs a heating process on the preceding second sheet 124 (for example, the first one of the second sheets 124), the control unit 22 controls the operation of the transporting unit 14 to transport the next second sheet 124 (the second one of the second sheets 124) from the second accommodation unit 122 to the register roller 141. At a timing at which the preceding second sheet 124 picked and transported by the register roller 141 passes through the register roller 141 in a direction of the heating unit 15, subsequently, the next second sheet 124 (the second one of the second sheets 124) is picked by the register roller 141. The first sheet 123 picked by the register roller 141 temporarily waits for a timing that does not overlap the second sheet 124 that is transported first such that the timing to transport the sheets to the heating unit 15 is adjusted. The image forming apparatus 1 continuously performs the erasing process by adjusting the transport timing and transporting the second sheets 124.

In the image forming apparatus 1, an operation in a case where both the job being performed and a newly received job (a job to be performed subsequently) are the printing job or the erasing job will be described.

As illustrated in FIG. 3A, in ACT 105, the control unit 22 determines whether or not a new job is received from the operation panel 19 or the information terminal device. In other words, the control unit 22 determines whether or not there is a job to be performed after the job being performed. When the control unit 22 determines that the new job is received from the operation panel 19 or the information terminal device (Yes in ACT 105), the operation of the image forming apparatus 1 proceeds to ACT 107. As illustrated in FIG. 3B, in ACT 107, the control unit 22 determines whether or not the operation mode needs to be switched from the printing job to the erasing job by receiving the new job. When the control unit 22 determines that the operation mode does not need to be switched from the printing job to the erasing job (No in ACT 107), the operation of the image forming apparatus 1 proceeds to ACT 108. In ACT 108, the control unit 22 determines whether or not the operation mode needs to be switched from the erasing job to the printing job by receiving the new job. When the control unit 22 determines that the operation mode does not need to be switched from the erasing job to the printing job (No in ACT 108), the operation of the image forming apparatus 1 proceeds to ACT 109. In ACT 109, the control unit 22 determines whether or not the newly received job is the printing job. When the control unit 22 determines that the newly received job is the printing job (Yes in ACT 109), the operation of the image forming apparatus 1 proceeds to ACT 103. In ACT 103, as described above, the image forming apparatus 1 performs the typical printing process. In ACT 109, when the control unit 22 determines that the newly received job is not the printing job (No in ACT 109), the operation of the image forming apparatus 1 proceeds to ACT 104. In ACT 104, as described above, the image forming apparatus 1 performs the typical erasing process. After performing the typical printing process in ACT 103 or after performing the typical erasing process in ACT 104, the operation of the image forming apparatus 1 proceeds to ACT 105. In ACT 105, the control unit 22 determines whether or not the operation panel 19 or the information terminal device receives the subsequent new job.

In the image forming apparatus 1, an operation in a case where a job being performed is the printing job and a job that is newly received to be performed subsequently is the erasing job will be described.

As described above, when the control unit 22 determines that the new job is received in ACT 105, the control unit 22 determines whether or not the operation mode needs to be switched from the printing job to the erasing job by receiving the new job in ACT 107, in other words, determines whether or not the new job to be executed subsequently is the erasing job other than the printing job being performed. When the control unit 22 determines that the new job to be performed subsequently is the erasing job other than the printing job which is the job being executed (Yes in ACT 107), the operation of the image forming apparatus 1 proceeds to ACT 110. As illustrated in FIG. 3C, in ACT 110, the control unit 22 determines that the last one of the first sheets 123 subjected to the printing job performed first is passing through the register roller 141. In ACT 111, the control unit 22 controls the operation of the transporting unit 14 to transport the second sheet 124 from the second accommodation unit 122 to the register roller 141 so as to perform the subsequent erasing job. The transporting unit 14 starts to transport the second sheet 124 accommodated in the second accommodation unit 122 to the register roller 141 while the last one of the first sheets 123 subjected to the printing job being performed passes through the register roller 141.

As the transport of the sheet is started in ACT 111, the last one of the first sheets 123 subjected to the printing job performed first and the initial one of the second sheets 124 subjected to the erasing job to be performed subsequently are transported to the register roller 141 at a predetermined interval as in the typical operation.

The typical operation is an operation in a case where the type of the job performed first and the type of the job to be performed subsequently are the same. For example, the typical operation is an operation in a case where the job performed first is the printing job and the job to be performed subsequently is the printing job, or in a case where the job performed first is the erasing job and the job to be performed subsequently is the erasing job. In the case where the job performed first and the job to be performed subsequently have the same type, the operation mode does not need to be switched in order to perform the subsequent job. On the other hand, as described above, in the case where the job performed first is the printing job and the job to be performed subsequently is the erasing job, the operation mode of the image forming apparatus 1 needs to be switched from the operation mode for performing the printing job to the operation mode for performing the erasing mode.

In the case where the operation mode needs to be switched, as the transport of the sheet is started in ACT 111, without waiting for the sheet for the preceding job to pass through the register roller 141, the sheet is continuously transported from the accommodation unit. The transport speed of the sheet is the same in the case where the operation mode is switched to perform the subsequent job and in the case where the operation mode is not switched to perform the subsequent job.

Therefore, in the case where the transport interval of sheets is the same, a time interval at which the sheets are transported from the sheet feeding unit 12 is the same in the case where the operation mode is switched to perform the subsequent job and in the case where the operation mode is not switched to perform the subsequent job.

In ACT 112, the control unit 22 determines whether or not the last one of the first sheets 123 for the printing job performed first passes through the heating unit 15. When the control unit 22 determines that the last one of the first sheets 123 passes through the heating unit 15 (Yes in ACT 112), the operation of the image forming apparatus 1 proceeds to ACT 113. In ACT 113, the control unit 22 controls the operation of the heating unit 15 to cause the heating temperature of the heating unit 15 to be the erasing temperature. The heating unit 15 raises the heating temperature from the fixing temperature to the erasing temperature. In ACT 114, the control unit 22 controls the operations of the transporting unit 14 and the register roller 141 to transport the first one of the second sheets 124 for the subsequent erasing job from the register roller 141 to the heating unit 15. The transporting unit 14 and the register roller 141 transport the second sheet 124 picked by the register roller 141 to the heating unit 15 in which the heating temperature is raised to the erasing temperature. The heating unit 15 heats the image of the transported second sheet 124 at the erasing temperature so as to be erased.

As described above, when the operation mode for the printing job is switched to the operation mode for the erasing job, the image forming apparatus 1 operates the transporting unit 14 before the process of heating the first sheet 123 (the sheet subjected to the printing job) by the heating unit 15 is completed. The transporting unit 14 transports the second sheet 124 in the second accommodation unit 122 to the position of the register roller 141 to wait at the position of the register roller 141. Since the second sheet 124 waits at the position of the register roller 141, time for the second sheet 124 to be transported to the heating unit 15 can be reduced. In other words, the control unit 22 starts to transport the first one of the second sheets 124 subjected to the subsequent erasing job while the first sheet 123 for the printing job is subjected to the heating process, thereby transporting the second sheet 124 to a predetermined standby position. Since the second sheet 124 is transported to the predetermined standby position, a start of the subsequent erasing job can be advanced. The predetermined standby position is a position on the upstream side in the sheet transport direction in relation to the secondary transfer position. The predetermined standby position is the position of the register roller 141 in this embodiment.

When the operation mode for the printing job is switched to the operation mode for the erasing job, the image forming apparatus 1 raises the heating temperature of the heating unit 15 from the fixing temperature to the erasing temperature as described above. In other words, the image forming apparatus 1 is temporarily in a preparation mode for changing the heating temperature (for raising the temperature) while the operation mode for the printing job is switched to the operation mode for the erasing job. The image forming apparatus 1 allows the first one of the second sheets 124 for the subsequent erasing job to be transported and wait at the predetermined standby position at least before the preparation mode is ended.

The image forming apparatus 1 has the operation mode for the printing job, the operation mode for the erasing job, the preparation mode, and a power saving mode. The power saving mode is an operation mode of suppressing power consumption of the image forming apparatus 1 by reducing power supplied to the image forming unit 3, the heating unit 15, and the like in a case where a state in which the job (the printing job and/or the erasing job) is not received from the operation panel 19 or the information terminal device continues for a predetermined time or longer. The heating temperature of the heating unit 15 in the operation mode for the printing job is the fixing temperature. The heating temperature of the heating unit 15 in the operation mode for the erasing job is the erasing temperature which is higher than the fixing temperature. The heating temperature of the heating unit 15 in the power saving mode is a standby temperature which is lower than the fixing temperature. Therefore, when the operation mode of the image forming apparatus is switched from the power saving mode to the operation mode for the printing job, the image forming apparatus 1 raises the heating temperature of the heating unit 15 from the standby temperature to the fixing temperature. Furthermore, when the operation mode of the image forming apparatus is switched from the power saving mode to the operation mode for the erasing job, the image forming apparatus 1 raises the heating temperature of the heating unit 15 from the standby temperature to the erasing temperature. On the other hand, when the operation mode of the image forming apparatus 1 is switched from the operation mode for the printing job to the operation mode for the erasing job, the image forming apparatus 1 raises the heating temperature of the heating unit 15 from the fixing temperature to the erasing temperature without temporarily lowering the heating temperature to the standby temperature as described above in the preparation mode.

As described above, when the operation mode for the printing job is switched to the operation for the erasing job, the image forming apparatus 1 transports the first one of the second sheets 124 for the subsequent erasing job to the predetermined standby position in advance to wait at the predetermined position such that the start of the subsequent erasing job can be advanced. Furthermore, the image forming apparatus 1 can perform the subsequent erasing job continuously from the preceding printing job.

In the image forming apparatus 1, an operation in a case where a job being performed is the erasing job and the subsequent job that is newly received is the printing job will be described.

As described above, when the control unit 22 determines that the new job is received in ACT 105 (Yes in ACT 105), in ACT 107, the control unit 22 determines whether or not the operation mode needs to be switched from the printing job to the erasing job by receiving the new job. Furthermore, in ACT 107, when the control unit 22 determines that the operation mode does not need to be switched from the printing job to the erasing job by receiving the new job (No in ACT 107), in ACT 108, the control unit 22 determines whether or not the operation mode needs to be switched from the erasing job to the printing job by receiving the new job, in order words, determines whether or not the new job is the printing job other than the erasing job performed first. When the control unit 22 determines that the new job is the printing job other than the erasing job performed first (Yes in ACT 108), the operation of the image forming apparatus 1 proceeds to ACT 115. In ACT 115, the control unit 22 determines whether or not the last one of the second sheets 124 subjected to the erasing job performed first is passing through the register roller 141. In ACT 116, the control unit 22 controls the operation of the transporting unit 14 to transport the first sheet 123 to the register roller 141 from the first accommodation unit 121 in order to perform the subsequent printing job. The transporting unit 14 starts to transport the first sheet 123 accommodated in the first accommodation unit 121 to the register roller 141 while the last one of the second sheets 124 subjected to the erasing job performed first passes through the register roller 141.

As the transport of the sheet is started in ACT 116, the last one of the second sheets 124 subjected to the erasing job performed first and the first one of the first sheets 123 subjected to the new subsequent printing job are transported to the register roller 141 at a predetermined interval as in the typical operation. As the transport of the sheet is started in ACT 116, the first sheet 123 is continuously transported from the first accommodation unit 121 without waiting for the second sheet 124 for the erasing job performed first to pass through the register roller 141. The transport speed of the sheet is the same in the case where the operation mode is switched to perform the subsequent job and in the case where the operation mode is not switched to perform the subsequent job. Therefore, in the case where the transport interval of sheets is the same, a time interval at which the sheets are transported from the sheet feeding unit 12 is the same in the case where the operation mode is switched to perform the subsequent job and in the case where the operation mode is not switched to perform the subsequent job.

In ACT 117, the control unit 22 determines whether or not the last one of the second sheets 124 for the erasing job performed first passes through the heating unit 15. When the control unit 22 determines that the last one of the second sheets 124 passes through the heating unit 15 (Yes in ACT 117), the operation of the image forming apparatus 1 proceeds to ACT 118. In ACT 118, the control unit 22 controls the operation of the heating unit 15 to cause the heating temperature of the heating unit 15 to be the fixing temperature. The heating unit 15 lowers the heating temperature from the erasing temperature to the fixing temperature. In ACT 119, the control unit 22 controls the operations of the transporting unit 14 and the register roller 141 to transport the first one of the first sheets 123 for the subsequent printing job from the register roller 141 to the image forming unit 13 and the heating unit 15. The transporting unit 14 and the register roller 141 transport the first sheet 123 picked by the register roller 141 to the image forming unit 13 and the heating unit 15 in which the heating temperature is lowered to the fixing temperature. The image forming unit 13 forms the image on the transported first one of the first sheets 123 for the printing job. The heating unit 15 heats the image formed on the first one of the first sheets 123 to fix the image to the first sheet 123, thereby performing the printing process.

As described above, when the operation mode for the erasing job is switched to the operation mode for the printing job, the image forming apparatus 1 operates the transporting unit 14 before the process of heating the second sheet 124 (the sheet subjected to the erasing job) by the heating unit 15 is completed. The transporting unit 14 transports the first sheet 123 in the first accommodation unit 121 to the position of the register roller 141 to wait at the position of the register roller 141. Since the first sheet 123 waits at the position of the register roller 141, time for the first sheet 123 to be transported to the heating unit 15 can be reduced. In other words, the control unit 22 starts to transport the first one of the first sheets 123 subjected to the subsequent printing job while the second sheet 124 for the erasing job is subjected to the heating process, thereby transporting the first sheet 123 to a predetermined standby position. Since the first sheet 123 is transported to the predetermined standby position, a start of the subsequent printing job can be advanced. The predetermined standby position is a position on the upstream side in the sheet transport direction in relation to the secondary transfer position. The predetermined standby position is the position of the register roller 141 in this embodiment.

When the operation mode for the erasing job is switched to the operation mode for the printing job, the image forming apparatus 1 lowers the heating temperature of the heating unit 15 from the erasing temperature to the fixing temperature as described above. In other words, the image forming apparatus 1 is temporarily in the preparation mode for lowering the heating temperature while the operation mode for the erasing job is switched to the operation mode for the printing job. In the preparation mode, the image forming apparatus 1 allows the first one of the first sheets 123 for the subsequent printing job to be transported and wait at the predetermined standby position at least before the preparation mode is ended.

When the operation mode of the image forming apparatus 1 is switched from the operation mode for the erasing job to the operation mode for the printing job, in the preparation mode, the image forming apparatus 1 lowers the heating temperature of the heating unit 15 from the erasing temperature to the fixing temperature without temporarily lowering the heating temperature to the standby temperature as described above.

As described above, when the operation mode for the erasing job is switched to the operation for the printing job, the image forming apparatus 1 transports the first one of the first sheets 123 for the subsequent printing job to the predetermined standby position in advance to wait at the predetermined position such that the start of the subsequent printing job can be advanced. Furthermore, the image forming apparatus 1 can perform the subsequent printing job continuously from the preceding erasing job.

The image forming apparatus 1 repeatedly performs the above-described operations when receiving a new subsequent job.

Figure 4A:
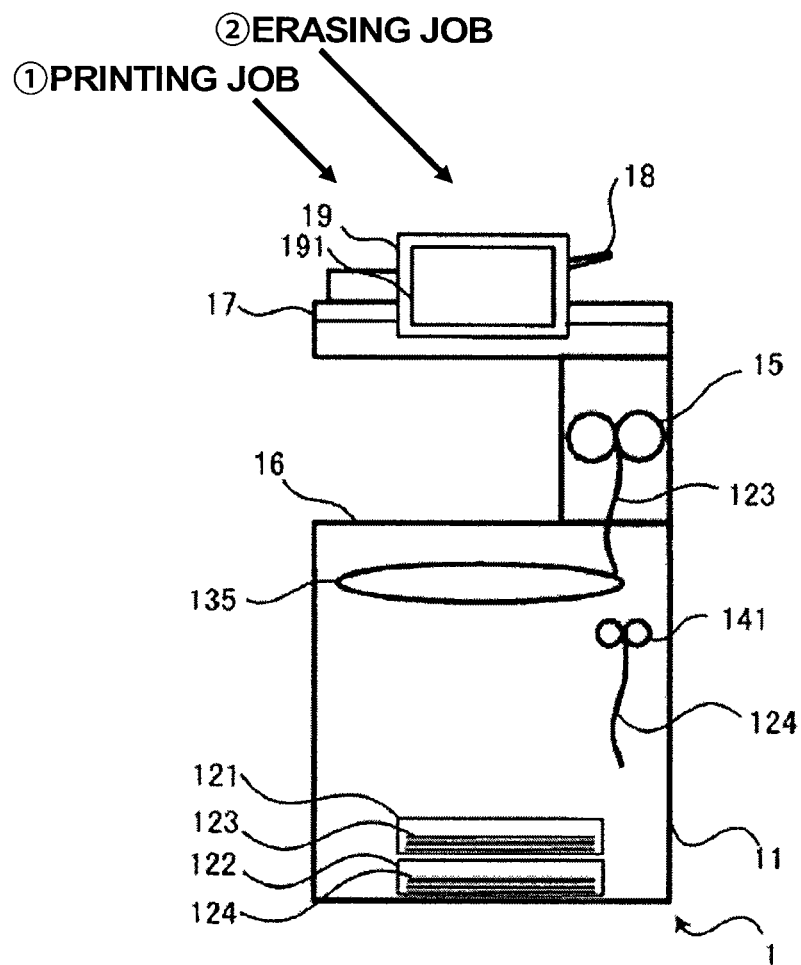
FIGS. 4A and 4B are explanatory views illustrating operations in a case where the image forming apparatus of the embodiment performs an erasing job subsequent to a printing job.
Figure 4B:
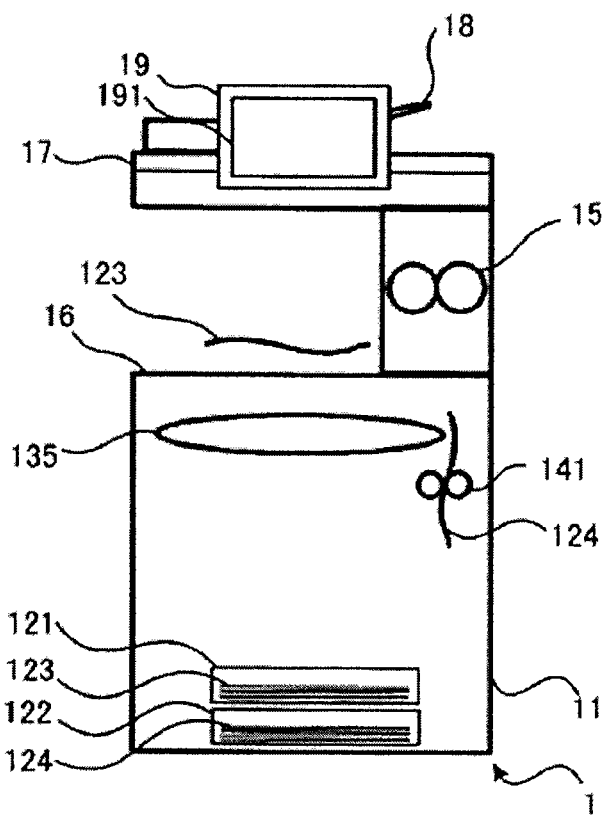
Figure 5A:
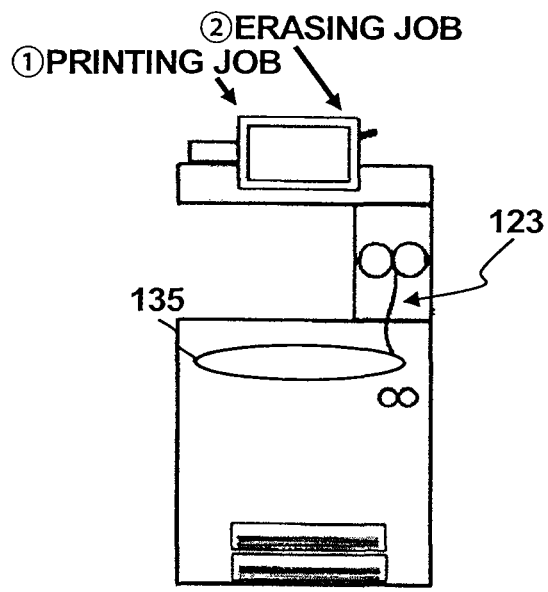
FIGS. 5A to 5C are explanatory views illustrating operations in a case where an image forming apparatus according to the related art performs the erasing job subsequent to the printing job.
Figure 5B:
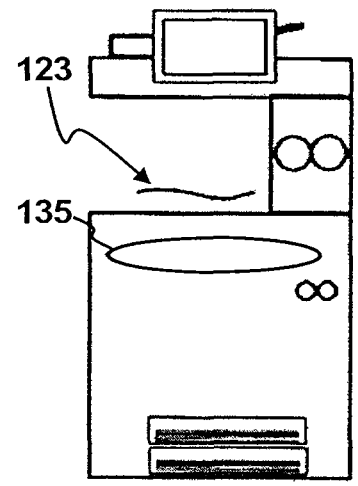
Figure 5C:
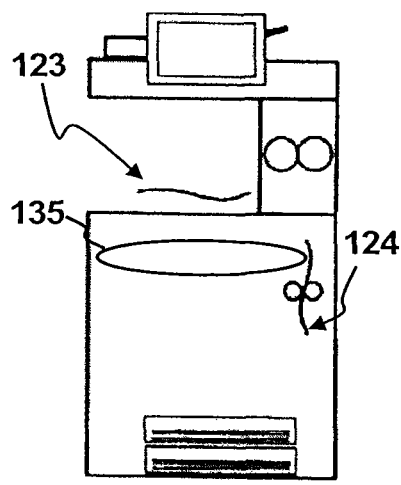

The above operations performed in the image forming apparatus 1 will be described in more detail in comparison to an image forming apparatus which does not employ this embodiment. Hereinafter, the image forming apparatus that does not employ this embodiment is referred to as an image forming apparatus according to the related art. FIG. 4A is a diagram illustrating a state in which an erasing job is performed in the image forming apparatus 1 subsequent to a printing job performed first, and FIG. 4B is a diagram illustrating a state in which the printing job in the state of FIG. 4A is completed. On the other hand, FIG. 5A is a diagram illustrating a state in which an erasing job is performed in the image forming apparatus which does not employ this embodiment subsequent to a printing job performed first, and FIG. 5B is a diagram illustrating a state in which the printing job in the state of FIG. 5A is completed. Furthermore, FIG. 5C is a diagram illustrating a state in which the erasing job is performed in the image forming apparatus which does not employ this embodiment after switching the operation mode.

The operation of the image forming apparatus 1 according to this embodiment in the case where a job performed first is the printing job and the job to be performed subsequently is the erasing job will be described with reference to FIGS. 4A and 4B. In a stage in which the printing process (transfer process or fixing process) is performed on the last one of the first sheets 123 subjected to the printing job, the control unit 22 controls the operation of the transporting unit 14 to transport the first one of the second sheets 124 for the subsequent erasing job to the position of the register roller 141. As illustrated in FIG. 4A, the transporting unit 14 transports the second sheet 124 to the position of the register roller 141 to wait at the position of the register roller 141 before the printing process performed on the first sheet 123 is completed.

Furthermore, when the control unit 22 determines that the last one of the first sheets 123 for the printing job has passed through the heating unit 15, as described above, the image forming apparatus 1 enters the preparation mode and raises the heating temperature of the heating unit 15 to the erasing temperature. When the heating temperature of the heating unit 15 reaches the erasing temperature, the image forming apparatus 1 enters the operation mode for the erasing job. When the image forming apparatus 1 is switched to the operation mode for the erasing job, the second sheet 124 for the subsequent erasing job waits at the position of the register roller 141 in advance.

Therefore, as illustrated in FIG. 4B, the subsequent erasing job can be started continuously from the completion of the printing job performed first. In the image forming apparatus 1 according to the embodiment, even in the case where the job performed first is the erasing job and the job to be performed subsequently is the printing job, similarly, the subsequent printing job can be started continuously from the completion of the erasing job.

In contrast, in the case of the image forming apparatus according to the related art, after a job performed first is completed, the subsequent job that is of a different type cannot be started continuously. An operation of the image forming apparatus according to the related art in a case where the job performed first is the printing job and the job to be performed subsequently is the erasing job will be described with reference to FIGS. 5A to 5C. As illustrated in FIG. 5A, the image forming apparatus according to the related art does not transport the first one of the second sheets 124 subjected to the subsequent erasing job in a stage in which the printing process is performed on the last one of the first sheets 123 subjected to the printing job. Furthermore, in the image forming apparatus according to the related art, as illustrated in FIG. 5B, even when the last one of the first sheets 123 subjected to the printing job passes through a heating unit and is discharged from the apparatus, the first one of the second sheets 124 for the subsequent erasing job is not transported. When the control unit determines that the last one of the first sheets 123 subjected to the printing job has passed through the heating unit, the image forming apparatus according to the related art enters the preparation mode and raises the heating temperature of the heating unit to the erasing temperature. When the heating temperature of the heating unit reaches the erasing temperature, the image forming apparatus according to the related art enters the operation mode for the erasing job. However, when the image forming apparatus according to the related art is in the operation mode for the erasing job, the second sheet 124 for the erasing job does not wait at the position of the register roller 141. The image forming apparatus according to the related art transports the second sheet 124 for the erasing job after entering the operation mode for the erasing job as illustrated in FIG. 5C. Therefore, in the image forming apparatus according to the related art, the subsequent erasing job is started non-continuously from the completion of the printing job performed first, which results in a waiting time for a user. Even in the case where the job performed first is the erasing job and the job to be performed subsequently is the erasing job, similarly, in the image forming apparatus according to the related art, a waiting time is taken for a user.

As described above, in the image forming apparatus 1 of the embodiment, in the case where two types of jobs are continuously performed, specifically, in the case where the printing job is performed subsequent to the erasing job and in the case where the erasing job is performed subsequent to the printing job, the first sheet subjected to the subsequent job is caused to wait at the predetermined standby position, for example, at the position of the register roller 141 during the preceding job. Furthermore, in the image forming apparatus 1 of the embodiment, even in the case where two types of jobs are continuously performed, sheets are transported from the sheet feeding unit 12 to the register roller 141 at the same transport interval as the sheet transport interval in the case where the same type of job is continuously performed.

In the case where the erasing job is performed subsequent to the printing job, when the printing job performed first is ended, the image forming apparatus 1 of the embodiment enters the preparation mode from the operation mode for the printing job and raises the heating temperature of the heating unit 15 to the erasing temperature. When the heating temperature of the heating unit 15 reaches the erasing temperature, the image forming apparatus 1 enters the operation mode for the erasing job from the preparation mode. The image forming apparatus 1 causes the first one of the second sheets 124 for the erasing job to wait at the predetermined standby position at least before the preparation mode is ended, and when entering the operation mode for the erasing job from the preparation mode, transports the second sheet 124 from the predetermined standby position to the heating unit 15. Therefore, the image forming apparatus 1 can rapidly start the erasing job after ending the preceding printing job.

Even in case where the printing job is performed subsequent to the erasing job, similarly, the image forming apparatus 1 of the embodiment causes the first one of the first sheets 123 for the printing job to wait at the predetermined standby position at least before the preparation mode is ended, and when entering the operation mode for the printing job, transports the first sheet 123 from the predetermined standby position to the image forming unit 13 and the heating unit 15. Therefore, the image forming apparatus 1 can rapidly start the printing job after ending the preceding erasing job.

In the image forming apparatus 1 of the embodiment, the predetermined standby position of the first sheet 123 in the case where the printing job is performed after the erasing job and the predetermined standby position of the second sheet 124 in the case where the erasing job is performed after the printing job are set to the position of the register roller 141, but the standby positions are not limited thereto. The standby position may be between the first accommodation unit 121 or the second accommodation unit 122 and the secondary transfer position which is an image formation position of the image forming unit 13.

The image forming apparatus 1 of the embodiment includes, for example, a register sensor (not illustrated) on the upstream side of the register roller 141 in order to detect presence or absence of the sheet at the position of the register roller 141. The control unit 22 may be configured to control the operations of the transporting unit 14 and the register roller 141 on the basis of, for example, ON/OFF signals of the register sensor. Furthermore, the image forming apparatus 1 of the embodiment includes, for example, a discharge sensor (not illustrated) on the upstream side of the heating unit 15 in order to detect presence or absence of the sheet at the position of the heating unit 15. The control unit 22 may be configured to control the heating temperature of the heating unit 15, the operation of the transporting unit 14, and the like on the basis of, for example, ON/OFF signals of the discharge sensor.

The program described in this embodiment is recorded on a computer-readable recording medium and read by a computer, and has a function of executing the processing method using the image forming apparatus 1 of this embodiment in the computer. This embodiment has a configuration in which the program is recorded on the inside of the image forming apparatus 1 in advance, but is not limited to this configuration. The image forming apparatus 1 may have a configuration in which the program is downloaded from, for example, the network communication unit 23, or may have a configuration in which a program stored in an external recording medium is installed. The recording medium may be of any type such as a CO-ROM as long as the recording medium can store the program and can be read by the image forming apparatus 1. Furthermore, the function of the program that can be obtained by installation or download may be realized in cooperation with the OS (Operating System) in the image forming apparatus 1, and the like.

As described above in detail, according to the embodiment, in the case where different types of jobs are continuously performed, the waiting time for the user can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus for performing a printing job and an erasing job, comprising:
   a sheet feeding unit configured to accommodate sheets;
   an image forming unit configured to form the image on the sheet in a case of performing the printing job;
   a register roller configured to transport the sheet to the image formation position at a timing at which the image forming apparatus forms the image on the sheet, the register roller being positioned upstream in a sheet transport direction relative to an image formation position at which the image forming apparatus forms the image on the sheet;
   a heating unit configured to heat the image at a fixing temperature in order to fix an image formed on a sheet in the case of performing the printing job and to heat the image at an erasing temperature in order to erase an image formed on the sheet in a case of performing the erasing job;
   a transporting unit configured to transport the sheet from the sheet feeding unit to the heating unit via an image forming unit; and
   a control unit configured to, in a case of performing the printing job and the erasing job:
     control the transporting unit so that the sheet for a second job of the printing job and the erasing job is transported to a predetermined standby position from the sheet feeding unit while a first job of the printing job and the erasing job is performed,
     control the heating unit to change a heating temperature of the heating unit for performing the second job while controlling the transporting unit to cause the sheet for the second job to wait at the predetermined standby position before changing the heating temperature,
     control the transporting unit so that the sheet for the second job is transported from the predetermined standby position to reach the heating unit after changing the heating temperature, wherein,
   in a case of determining that the last sheet for the first job has passed through the register roller, the control unit controls the transporting unit to transport the first sheet for the second job to the predetermined standby position, and the predetermined standby position is a position of the register roller.

2. The image forming apparatus according to claim 1, wherein, in a case of determining that the last sheet for the first job has passed through the heating unit, the control unit controls the heating unit to change the heating temperature of the heating unit for performing the second job.

3. The image forming apparatus according to claim 2, wherein the control unit controls the transporting unit to transport the first sheet for the second job from the position of the register roller to the heating unit of which the heating temperature is changed for the other job.

4. The image forming apparatus according to claim 3, wherein the sheet feeding unit includes a first accommodation unit which accommodates a first sheet for the first job and a second accommodation unit which accommodates a second sheet for the second job, and the transporting unit transports the first sheet from the first accommodation unit in the case of performing the first job, and transports the second sheet from the second accommodation unit in the case of performing the second job.

5. The image forming apparatus according to claim 4, wherein the control unit controls the transporting unit so that an interval between the first sheet being transported from the first accommodation unit and the second sheet being transported from the second accommodation unit after the first sheet is the same as an interval between which two sheets are transported from any one of the first accommodation unit and the second accommodation unit.

* * * * *